(12) United States Patent
Winbow et al.

(10) Patent No.: US 8,965,059 B2
(45) Date of Patent: Feb. 24, 2015

(54) EFFICIENT COMPUTATION OF WAVE EQUATION MIGRATION ANGLE GATHERS

(75) Inventors: Graham A. Winbow, Mill Creek, WA (US); Thomas A. Dickens, Houston, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 46 days.

(21) Appl. No.: 13/640,291

(22) PCT Filed: Apr. 22, 2011

(86) PCT No.: PCT/US2011/033520
§ 371 (c)(1),
(2), (4) Date: Oct. 9, 2012

(87) PCT Pub. No.: WO2011/152928
PCT Pub. Date: Dec. 8, 2011

(65) Prior Publication Data
US 2013/0064431 A1    Mar. 14, 2013

Related U.S. Application Data

(60) Provisional application No. 61/350,783, filed on Jun. 2, 2010, provisional application No. 61/472,955, filed on Apr. 7, 2011.

(51) Int. Cl.
*G06K 9/00* (2006.01)
*G01V 1/28* (2006.01)

(52) U.S. Cl.
CPC .......... *G01V 1/282* (2013.01); *G01V 2210/614* (2013.01)
USPC ........................................................ 382/109

(58) Field of Classification Search
None
See application file for complete search history.

(56) References Cited

U.S. PATENT DOCUMENTS

| 5,274,605 A | 12/1993 | Hill |
| 5,349,527 A | 9/1994 | Pieprzak et al. |

(Continued)

FOREIGN PATENT DOCUMENTS

| EP | 2 104 869 | 11/2007 |
| EP | 2 171 500 | 7/2008 |

(Continued)

OTHER PUBLICATIONS

Cerveny (2001), "Seismic Ray Theory," Cambridge University Press, pp. 28-30.

(Continued)

*Primary Examiner* — Shervin Nakhjavan
(74) *Attorney, Agent, or Firm* — ExxonMobil Upstream Research Company Law Dept.

(57) ABSTRACT

Method for efficient computation of wave equation migration angle gathers by using multiple imaging conditions. Common reflection angle or common azimuth gathers or gathers including both common reflection angles and common azimuth angles are produced as the data are migrated. In the course of either wave equation migration or reverse time migration, the pressures and particle motion velocities that need to be computed are sufficient to also compute the Poynting vector pointing in the direction of source-side (35) or receiver-side (37) wavefield propagation. From that, the reflection and azimuth angles can be computed (38). The seismic images can then be stored in the appropriate angle bins, from which common reflection angle or azimuth data volumes can be assembled (39).

22 Claims, 5 Drawing Sheets

(56) References Cited

U.S. PATENT DOCUMENTS

| | | | |
|---|---|---|---|
| 5,677,893 A | 10/1997 | de Hoop et al. | |
| 5,852,588 A | 12/1998 | de Hoop et al. | |
| 5,999,488 A | 12/1999 | Smith | |
| 6,021,094 A | 2/2000 | Ober et al. | |
| 6,055,482 A | 4/2000 | Sudhakar et al. | |
| 6,292,754 B1 * | 9/2001 | Thomsen | 702/14 |
| 6,466,873 B2 | 10/2002 | Ren et al. | |
| 6,584,409 B2 | 6/2003 | Wisecup | |
| 6,687,618 B2 | 2/2004 | Bevc et al. | |
| 6,687,659 B1 | 2/2004 | Shen | |
| 6,778,909 B1 | 8/2004 | Popovici et al. | |
| 6,819,628 B2 | 11/2004 | Tal-Ezer | |
| 6,826,484 B2 | 11/2004 | Martinez et al. | |
| 6,856,911 B2 | 2/2005 | Wang et al. | |
| 6,904,368 B2 * | 6/2005 | Reshef et al. | 702/17 |
| 6,920,084 B2 | 7/2005 | MacKay | |
| 6,996,470 B2 | 2/2006 | Kamps | |
| 7,072,767 B2 | 7/2006 | Routh et al. | |
| 7,167,414 B2 | 1/2007 | Lee et al. | |
| 7,355,923 B2 | 4/2008 | Reshef et al. | |
| 7,373,252 B2 | 5/2008 | Sherrill et al. | |
| 7,388,808 B2 | 6/2008 | Lee et al. | |
| 7,391,675 B2 | 6/2008 | Drew | |
| 7,400,553 B1 | 7/2008 | Jin et al. | |
| 7,447,113 B2 | 11/2008 | Martinez et al. | |
| 7,502,690 B2 | 3/2009 | Thomsen et al. | |
| 7,584,056 B2 | 9/2009 | Koren | |
| 7,859,942 B2 | 12/2010 | Stork | |
| 7,941,273 B2 | 5/2011 | Thomsen et al. | |
| 8,068,384 B2 | 11/2011 | Saenger et al. | |
| 8,619,498 B2 * | 12/2013 | Xu et al. | 367/38 |
| 2002/0103602 A1 * | 8/2002 | Meng | 702/14 |
| 2006/0153005 A1 | 7/2006 | Herwanger et al. | |
| 2007/0271041 A1 | 11/2007 | Peng | |
| 2008/0033656 A1 | 2/2008 | Herwanger | |
| 2008/0137480 A1 | 6/2008 | MacNeill | |
| 2008/0175101 A1 | 7/2008 | Saenger et al. | |
| 2008/0215246 A1 | 9/2008 | Stork | |
| 2008/0259727 A1 | 10/2008 | Drew | |
| 2009/0010104 A1 | 1/2009 | Leaney | |
| 2009/0043545 A1 | 2/2009 | van Manen et al. | |
| 2009/0052280 A1 | 2/2009 | Herrmann et al. | |
| 2009/0070042 A1 | 3/2009 | Birchwood et al. | |
| 2009/0257308 A1 * | 10/2009 | Bevc et al. | 367/53 |
| 2009/0306900 A1 * | 12/2009 | Jing et al. | 702/13 |
| 2010/0061184 A1 * | 3/2010 | Winbow | 367/73 |
| 2010/0088035 A1 | 4/2010 | Etgen et al. | |
| 2010/0114494 A1 * | 5/2010 | Higginbotham et al. | 702/16 |
| 2010/0118654 A1 * | 5/2010 | He et al. | 367/57 |
| 2010/0161233 A1 | 6/2010 | Saenger et al. | |
| 2010/0161234 A1 | 6/2010 | Saenger et al. | |
| 2010/0220895 A1 | 9/2010 | Koren et al. | |
| 2011/0069582 A1 | 3/2011 | Nichols et al. | |
| 2011/0096625 A1 * | 4/2011 | Rentsch et al. | 367/38 |
| 2011/0110190 A1 * | 5/2011 | Thomson et al. | 367/38 |
| 2011/0288831 A1 * | 11/2011 | Tan et al. | 703/2 |

FOREIGN PATENT DOCUMENTS

| | | |
|---|---|---|
| WO | WO 2008/095289 | 8/2008 |
| WO | WO 2008/145742 | 12/2008 |
| WO | WO 2011/041782 | 4/2011 |
| WO | WO 2011/053327 | 5/2011 |
| WO | WO 2011/136760 | 11/2011 |
| WO | WO 2011/141440 | 11/2011 |

OTHER PUBLICATIONS

Higginbotham, J. et al. (2010), "Depth migration velocity model building with wave equation imaging," *First Break*, pp. 27-33.

Sava, P. et al. (2005), "Coordinate-independent angle-gathers for wave equation migration," *SEG Expanded Abstracts* 24, 4 pgs.

Thomsen (1986), "Weak elastic anisotrophy," *Geophysics* 51, pp. 1954-1966.

Tsvankin (2001), "Seismic Signatures and Analysis of Reflection Data in Anisotropic Media," Pergamon, pp. 6-7.

Yoon, K. et al. (2006), "Reverse-time migration using the Poynting vector," *Exploration Geophysics* 37, pp. 102-106.

Xie, X-B. et al. (2002), "Extracting angle domain information from migrated wavefield," *SEG Expanded Abstracts* 21, 4 pgs.

International Search Report & Written Opinion, dated Aug. 3, 2011, PCT/US2011/033520.

* cited by examiner

EFFICIENT COMPUTATION OF WAVE EQUATION MIGRATION ANGLE GATHERS

CROSS-REFERENCE TO RELATED APPLICATION

This application is the National Stage of International Application No. PCT/US2011/033520, that published as WO 2011/152928, filed 22 Apr. 2011, which claims the benefit of U.S. Provisional Application No. 61/350,783 filed 2 Jun. 2010 and U.S. Provisional Application No, 61,472,955, filed 7 Apr. 2011, each of which is incorporated herein by reference, in its entirety, for all purpose. entitled EFFICIENT COMPUTATION OF WAVE EQUATION MIGRATION ANGLE GATHERS, both of which are incorporated by reference herein in their entirety.

FIELD OF THE INVENTION

This invention relates generally to the field of geophysical prospecting, and more particularly to the processing of seismic data. Specifically, the disclosure describes a method for migrating seismic data with efficient calculation at each image point of common reflection angle or common azimuth angle gathers or gathers including both common reflection angles and common azimuth angles.

BACKGROUND OF THE INVENTION

In complex geological environments, wave equation migration is recognized to be the best imaging technique currently available for imaging seismic data. Wave equation migration comes in two forms usually called WEM and RTM. In WEM ("Wave Equation Migration") energy is back propagated from the receivers using a one-way wave equation, and forward propagated from the corresponding source. The wave fields are cross correlated at each image point to create the subsurface seismic image. This method can produce good images for reflectors whose dip is relatively shallow. In RTM ("Reverse Time Migration") the wave field at the receivers is back-propagated using a two-way wave equation, and is cross correlated with energy forward propagated from the source. This method can produce good images at all reflector dips, but is more expensive than WEM by a factor typically in the range of 4-10. However it is not straightforward with either method to efficiently produce common reflection angle gathers. Such gathers are useful in interpretation of the seismic images and also in velocity analysis. It is also possible to work with surface offset gathers; however these are less useful than angle gathers in complex imaging situations because they do not handle multipathing.

Current Technology

One way of deriving angle domain image gathers (Xie and Wu, 2002) uses local plane wave decomposition. This method has the disadvantage that it requires computation of a local Fourier transform, and is therefore not computationally efficient if angle gathers are required at many image points.

In wave equation migration methods generally, the image is produced by an imaging condition such as:

$$D_M(\vec{x}) = \int d\omega p_s(\vec{x},\omega) p_r^*(\vec{x},\omega) \quad (1)$$

where the subscripts s and r respectively label the source and receiver side wave fields, the source side wave field being forward propagated from a source location, and the receiver side wave field being back propagated from receiver locations. As is well known all such cross correlations may be performed in either the frequency or the time domain. For the sake of brevity, in this document the equations are written in the frequency domain, but should be understood to apply in either domain. The symbol * means the complex conjugate. The label M refers to the fact that the data have been migrated to form an image at point $\vec{x}$. [Notation: in the following text, all vectors are presumed to be in 3D and are denoted by symbols with an arrow over them (e.g. $\vec{x}$). Symbols with a caret over them (e.g. $\hat{n}$) are unit vectors.] Equation 1 refers to the simplest type of model which only includes P-waves in an isotropic medium. The general case will be discussed later in connection with equation 12.

Another way of creating angle gathers (Sava and Fomel, 2005) displaces image points from the source and receiver side wave fields $p_s$ and $p_r$, producing an image $D_M$ by cross correlating as follows:

$$D_M(\vec{x},\vec{h}) = \int d\omega p_s(\vec{x}-\vec{h},\omega) p_r^*(\vec{x}+\vec{h},\omega) \quad (2)$$

This cross correlation step in processing is a generalization of the previous imaging condition and would normally replace that imaging condition in wave equation based imaging. In this case, the output is subsurface offset gathers labeled by the parameter $\vec{h}$. This is a non-local method that may smear the spatial resolution of the output. A further problem with this approach is that it requires the computation and storage of data volumes for each value of $\vec{h}$. This approach may leads to impractical quantities of data, especially in 3D unless the 3D image space $\vec{x}$ is sampled on a coarse grid.

SUMMARY OF THE INVENTION

In a general embodiment, the invention is a method for imaging seismic data from a subsurface region and producing, as the data are migrated, common reflection angle or common azimuth gathers or producing gathers that are functions of both common reflection angles and common azimuth angles, comprising performing the following steps on a computer:

(a) computing the stress tensor and local particle velocity of the source side and receiver side (suitably propagated forwards and backwards to selected image points) at a multiplicity of image points, (b) computing the direction of energy propagation for the source side and receiver side at said selected image points, (c) converting the direction of energy propagation to the direction of phase variation (the phase velocity), (d) using this information to construct the reflection angle, or the azimuth angle, or both the reflection angle and the phase angle, and (e) outputting the result to construct gathers depending on the reflection angle, or the azimuth angle, or both the reflection angle and the phase angle.

In the simplest models, the stress tensor is equal to the negative of the pressure multiplied by a unit tensor, and in an isotropic medium step (c) is unnecessary.

The image value at each of the image points may be computed from a cross correlation of a forward propagated wavefield and a backward propagated wavefield, using either wave equation migration (WEM) or reverse time migration (RTM).

In a more specific embodiment describing migrating shot gathers in an isotropic medium, with reference to the flow chart of FIG. 3, the invention is a method for imaging seismic data from a subsurface region and producing, as the data are migrated, common reflection angle or common azimuth gathers or producing gathers that are functions of both common reflection angles and common azimuth angles, said method comprising performing the following steps on a computer:

selecting a velocity model for the subsurface region and a set of reflection angle bins (step 31);

forward propagating, using the velocity model, a seismic wavefield from a selected source location, generating a source-side wave field (step 32);

backward propagating, using the velocity model, a seismic wavefield from receiver locations corresponding to the selected source location, generating a receiver-side wave field (step 33);

cross correlating local particle velocity field of said source-side wave field with pressure of said receiver-side wave field at selected image points, resulting in a first cross correlation (step 34);

computing a first unit vector corresponding to said first cross correlation (step 35);

cross correlating local particle velocity field of said receiver-side wave field with pressure of said source-side wave field at said selected image points, resulting in a second cross correlation (step 36);

computing a second unit vector corresponding to said second cross correlation (step 37);

estimating a reflection angle and a reflection angle bin for the selected image points using said first and second unit vectors (step 38); and cross correlating the pressures of said wave fields at the selected image points yielding a seismic image at the selected image points, and storing the seismic image in a data volume labeled by said reflection angle bin (step 39).

If the words "source" and "receiver" are exchanged, an alternative embodiment of the invention called migrating receiver gathers is described.

The last embodiment may be performed alternatively using pressure and particle velocity (already computed for the migration process) to compute the vector describing the energy flow (the "Poynting vector") on both source-side and receiver-side wave fields. This approach is equivalent to the last above embodiment for isotropic velocities and is advantageous for anisotropic velocities often encountered in practice. In anisotropic formations or explicitly solid media, the stress tensor is calculated instead of the pressure field.

BRIEF DESCRIPTION OF THE DRAWINGS

The present invention and its advantages will be better understood by referring to the following detailed description and the attached drawings in which.

Figure 1:
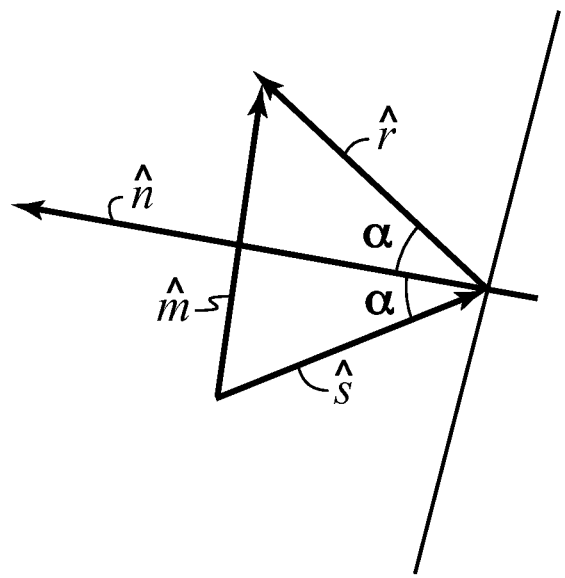
FIG. 1 illustrates particle motion for P-P reflection of reflection angle α as well as unit vectors referred to in the text.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

A teaching of the present invention is to continue the wave fields as described above, using either WEM or RTM, but to make the computationally inexpensive step of using multiple imaging conditions. For example for P-P imaging in an isotropic medium, the normal imaging condition in WEM and RTM is:

$$D_M(\vec{x}) = \int d\omega \, p_s(\vec{x},\omega) p_r^*(\vec{x},\omega) \tag{3}$$

The convolution can of course be performed in either the frequency or time domain. Now, for example, in RTM the downward continuation can be computed in time using the first order equations, where p is pressure, v is local particle velocity, ρ is density, and λ is the bulk modulus:

$$\rho \frac{\partial \vec{v}}{\partial t} = -\nabla p \tag{4}$$

$$\frac{\partial p}{\partial t} = -\lambda \, div(\vec{v}). \tag{5}$$

This means that at each image point the pressure and local particle velocity are both available. Therefore one can also compute:

$$\vec{s}_M(\vec{x}) = \int d\omega \, \vec{v}_s(\vec{x},\omega) p_r^*(\vec{x},\omega) \tag{6}$$

This vector points in the direction of P-wave energy propagation at the image point $\vec{x}$.

Similarly the vector $$\vec{r}_M(\vec{x}) = \int d\omega \, p_s(\vec{x},\omega) \vec{v}_r^*(\vec{x},\omega) \tag{7}$$

points in the direction of the receiver side wave field at the image point. At each image point the receiver side pressure and the source side pressure differ from each other by only a factor of the reflection coefficient. In equation (6) if the source side pressure is substituted for the receiver side pressure one obtains a vector (the energy flow vector or Poynting vector) pointing in the direction of $\vec{s}_M(\vec{x})$ but differing from $\vec{s}_M(\vec{x})$ by a factor 1/R where R is the reflection coefficient. In equation (7) if the receiver side pressure is substituted for the source side pressure one obtains an output equal to R $\vec{r}_M(\vec{x})$. Either method is therefore able to measure the direction of energy flow at the image point. If the above vectors are normalized to be unit vectors $\hat{s}(\vec{x})$ and $\hat{r}(\vec{x})$, then it follows that:

$$\cos 2\alpha = -\hat{s}(\vec{x}) \cdot \hat{r}(\vec{x}) \tag{8}$$

which gives the reflection angle α (see FIG. 1) at the point $\vec{x}$ independent of the reflector dip. The reflector dip $\hat{n}$ is a unit vector illustrated in FIG. 1. In Cartesian components:

$$\hat{n} = [\sin\theta\cos\phi, \sin\theta\sin\phi, \cos\theta] \tag{9}$$

where θ is the colatitude and φ is the longitude. It can be recovered from $\hat{s}(\vec{x})$ and $\hat{r}(\vec{x})$ using the equation:

$$\hat{n} = (-\hat{s}+\hat{r})/(2\cos\alpha) \tag{10}$$

The foregoing means that at each image point, the image value, as well as the direction of particle motion for both the source side and the receiver side wave fields, can be computed.

Figure 2:
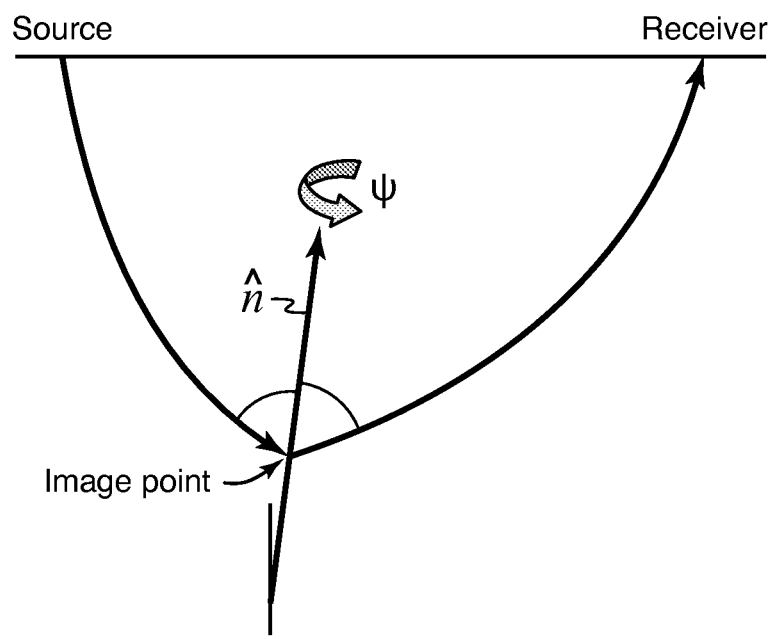
FIG. 2 illustrates imaging geometry in 3D for the present inventive method.
Figure 3:
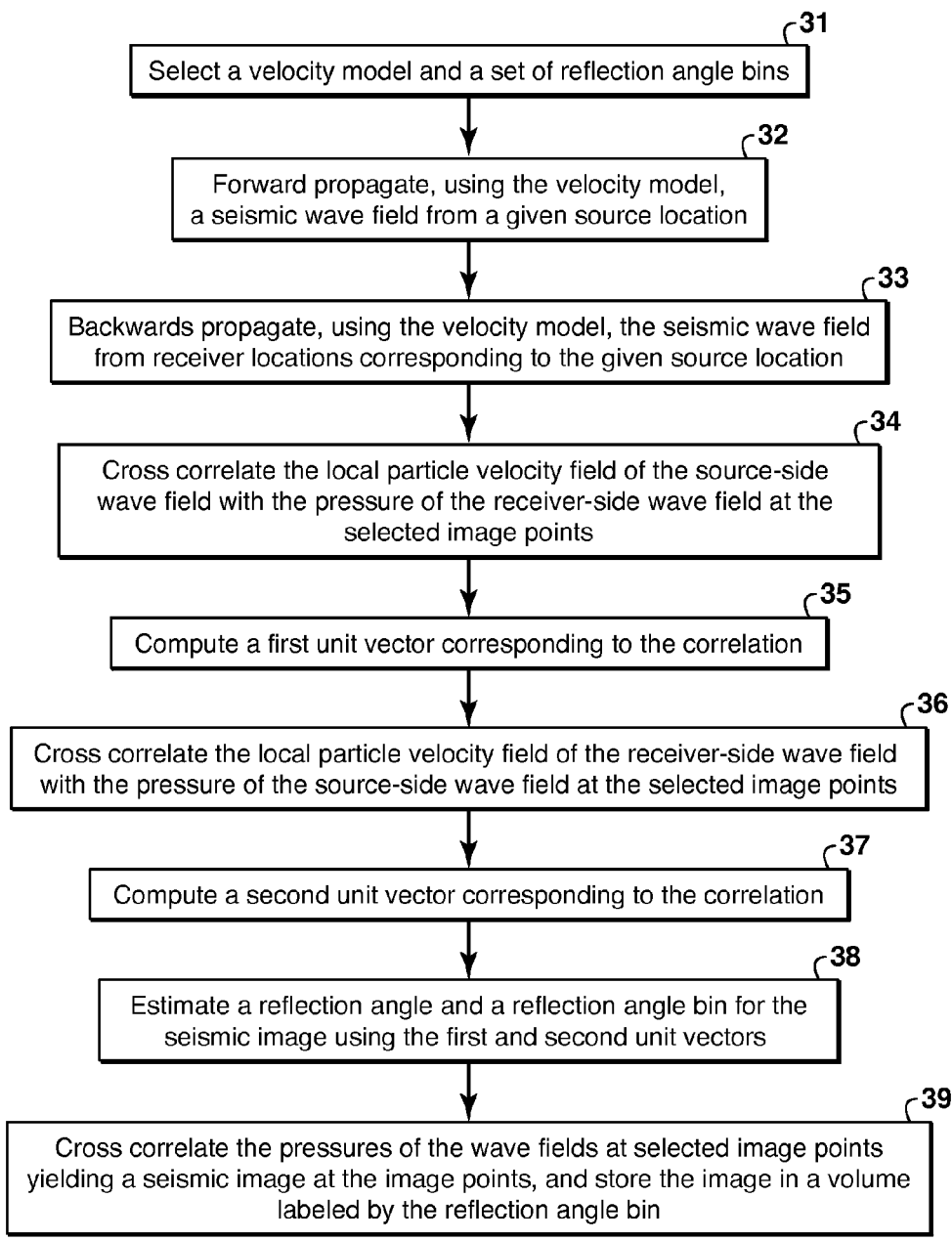
FIG. 3 is a flow chart showing basic steps in one embodiment of the present inventive method.

The unit vector $\hat{m}$ is defined by the equation:

$$\hat{m} = (\hat{s} + \hat{r})/(2 \sin \alpha) \tag{11}$$

and is illustrated in FIG. 1. The azimuthal angle $\psi$ illustrated in FIG. 2 can be recovered from $\hat{m}$ as explained in Winbow (2009) which is incorporated herein by reference in its entirety in all jurisdictions that allow it. As illustrated by FIG. 1, for isotropic P-wave propagation, the direction of particle motion coincides with the direction of energy propagation and reduces to the ray direction in the approximation of ray-based propagation.

By computing these quantities at each image point, and storing the images into the appropriate angle and/or azimuth image volume, common reflection angle volumes and/or common azimuth volumes can be computed in the same way as in Common Reflection Angle Migration (CRAM) (Winbow and Clee, 2006), which is incorporated herein by reference in its entirety in all jurisdictions that allow it.

The above description applies to the case of an isotropic medium but can be extended to the case of an anisotropic medium. Explicitly this may be done as follows.

In a general medium, the Poynting vector $\vec{S}$ gives the direction of energy flow:

$$S_i = -\tau_{ij} v_j \tag{12}$$

where $\tau_{ij}$ is the stress tensor and $v_j$ is the local particle velocity. In such media these quantities are calculated as part of the wave propagation computation. Therefore the Poynting vector is immediately available and can be used to define the propagation direction of the source and receiver side wave fields at each image point As is well known to those skilled in the art, for a simple isotropic model involving only P-waves, the stress tensor is proportional to a unit tensor and the Poynting vector is proportional to the particle velocity vector. Therefore in the case of an isotropic medium the particle velocity vector may be used to define the direction of energy propagation as used in equations (6) and (7).

In a general medium, as explained, for example, in Cerveny (2001) the time averaged Poynting vector is proportional to the group velocity vector (which can be computed from the phase velocity and the anisotropy parameters) through the equation:

$$\vec{V}_g E_{av} = \vec{S}_{av} \tag{13}$$

where the subscript "av" signifies time averaging and $E_{av}$ signifies the time averaged elastic wave field energy density. Therefore either the Poynting vector or the group velocity vector can be used to specify the direction of energy transport. Reflection coefficients are usually given in terms of the phase velocity direction based on the phase velocity $V_{ph}$, which in an anisotropic medium depends on the direction angles $\theta$ and $\phi$ of the phase velocity. The phase velocity can be deduced from the group velocity, and the phase reflection angle and azimuth can be found from the group velocity. Explicitly, expressions for the three components of the group velocity can be written as:

$$\frac{V_g \sin\theta_g}{V_{ph}} = \cos\phi \left( \sin\theta + \frac{1}{V_{ph}} \frac{\partial V_{ph}}{\partial \theta} \cos\theta \right) - \frac{\sin\phi}{\sin\theta} \frac{1}{V_{ph}} \frac{\partial V_{ph}}{\partial \phi} \tag{14}$$

Figure 4:
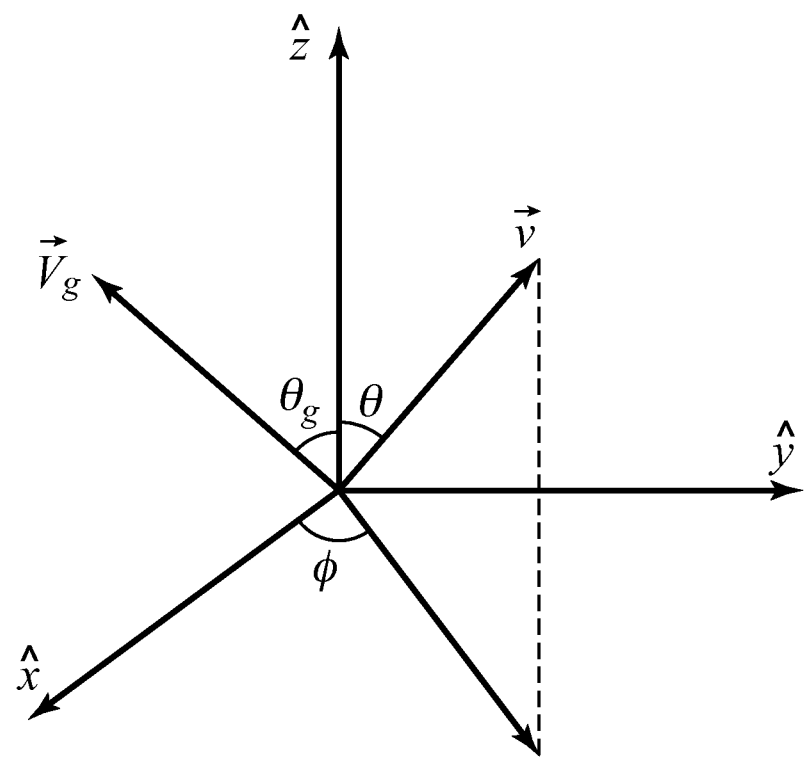
FIG. 4 illustrates angles required for discussion of the case of anisotropy.

-continued $$0 = \sin\phi \left( \sin\theta + \frac{1}{V_{ph}} \frac{\partial V_{ph}}{\partial \theta} \cos\theta \right) + \frac{\cos\phi}{\sin\theta} \frac{1}{V_{ph}} \frac{\partial V_{ph}}{\partial \phi}$$

$$\frac{V_g \cos\theta_g}{V_{ph}} = \cos\theta - \frac{1}{V_{ph}} \frac{\partial V_{ph}}{\partial \theta} \sin\theta$$

where the group velocity is taken to be in the plane $\phi=0$ with a direction specified by the angle $\theta_g$. These equations are derived in the same way as Tsvankin (2001, Seismic Signatures and Analysis of Reflection Data in Anisotropic Media, publ. Pergamon, pp 6-7) except that the coordinates are rotated around the z-axis by the angle $\phi$. In Tsvankin's work the phase velocity is taken in the plane $\phi=0$. The geometry of the group and phase velocity is shown in FIG. 4. In an isotropic medium, these two velocity vectors will be aligned in the same direction. The quantities $$V_{ph}, \frac{\partial V_{ph}}{\partial \theta}, \text{ and } \frac{\partial V_{ph}}{\partial \phi}$$

are known from the anisotropy parameters. Thus $\theta$ and $\phi$ can be determined and the direction of the phase velocity is fixed.

In some cases the magnitude of the Poynting vector may be more uncertain than its direction. In such cases the equations can be solved in terms of the group angles $\theta_g$ and $\phi$ in the form:

$$\tan\theta_g = \frac{\cos\phi \left( \sin\theta + \frac{1}{V_{ph}} \frac{\partial V_{ph}}{\partial \theta} \cos\theta \right) - \frac{\sin\phi}{\sin\theta} \frac{1}{V_{ph}} \frac{\partial V_{ph}}{\partial \phi}}{\cos\theta - \frac{1}{V_{ph}} \frac{\partial V_{ph}}{\partial \theta} \sin\theta} \tag{15}$$

$$\tan\phi = -\frac{1}{\sin\theta} \left( \frac{1}{V_{ph}} \frac{\partial V_{ph}}{\partial \phi} \right) \cdot \frac{1}{\sin\theta + \left( \frac{1}{V_{ph}} \frac{\partial V_{ph}}{\partial \theta} \right) \cos\theta}$$

It usually happens that the quantities $$\frac{\partial V_{ph}}{\partial \theta} \text{ and } \frac{\partial V_{ph}}{\partial \theta}$$

are small (Thomsen, *Geophysics* 51, 1954-1966 (1986)) in which case the solution of these equations can be found conveniently in first order perturbation theory as:

$$\theta = \theta_g - \frac{1}{V_{ph}} \frac{\partial V_{ph}}{\partial \theta} \tag{16}$$

$$\phi = -\frac{1}{\sin^2\theta_g} \left( \frac{1}{V_{ph}} \frac{\partial V_{ph}}{\partial \phi} \right)$$

Two additional steps are found to be advantageous when utilizing the local wave field direction information to produce angle gathers. First, since the wave field (pressure or particle motion) used to compute the propagation direction oscillates in time, the propagation direction is also found to oscillate. To obtain a consistent direction estimate at a given point, a process of smoothing the direction information in a spatial window surrounding the point is applied. This may be done by simply averaging the values of the components of the direction vector in a small rectangular area.

In addition, the construction of the binned angle gathers is different from the normal process of creating a stacked image. For the stacked image, all contributions to the image at a given spatial point are summed together, and this cancels the image at locations where there is no reflector and yields a large contribution at location where a reflector exists. For the angle gathers, one must first compute a reflection angle before summing the image component. At locations where there is no reflector, the reflection angle is meaningless.

Therefore, one must use some criterion to determine which direction vectors correspond to a real reflection event before using them to sum an image value into an angle bin. One way to do this is by comparing the magnitude of the energy propagation directions vectors (before they are normalized to be unit vectors) with the local kinetic energy of the wave field using equation (13) which relates the group velocity, the time averaged energy and the time averaged Poynting vector. If this relationship holds approximately, the image contribution is summed into the appropriate angle bin, otherwise it is rejected as noise.

Figure 5:
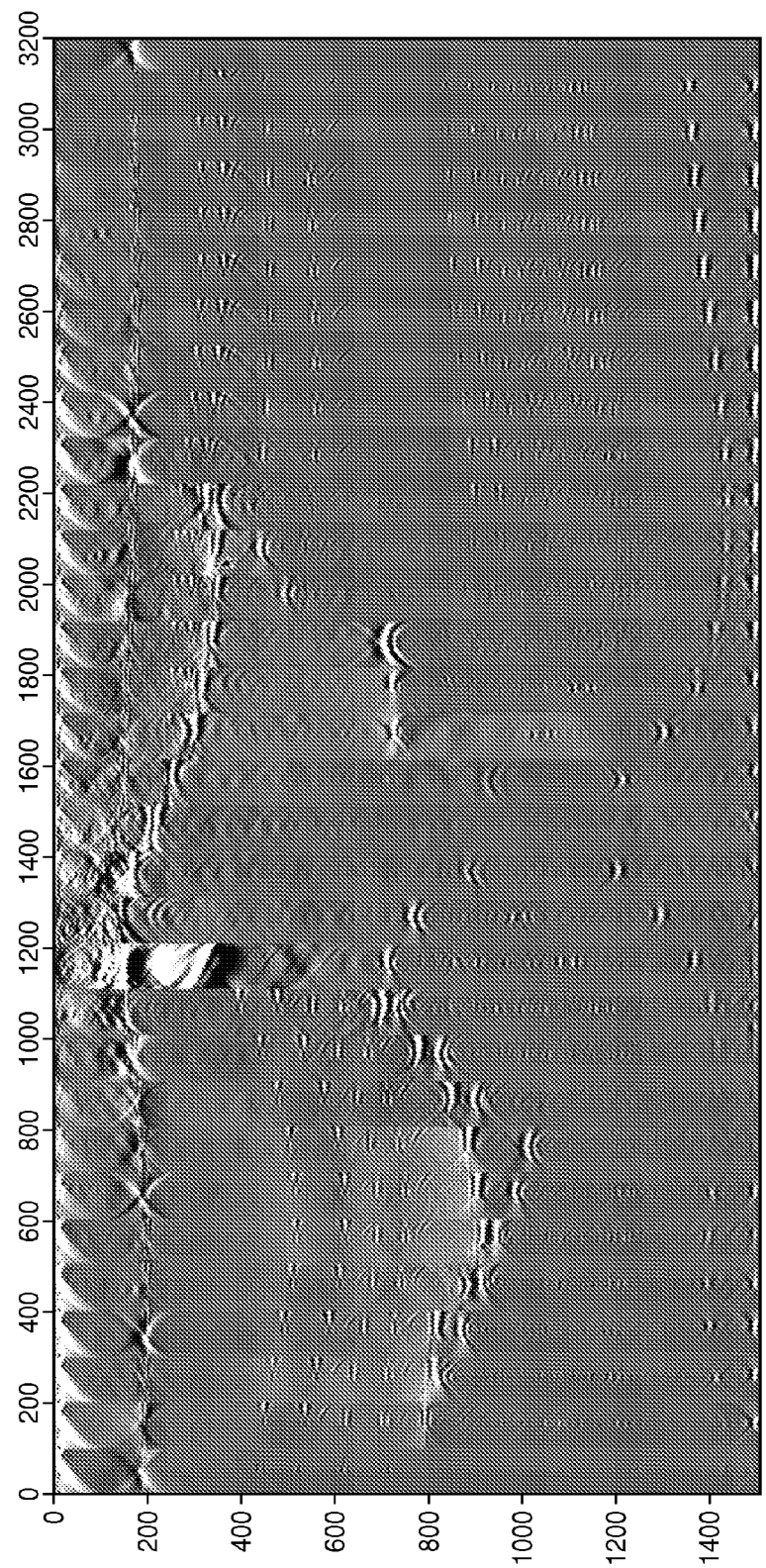
FIG. 5 illustrates the performance of the method of Sava and Fomel on a test dataset.
Figure 6:
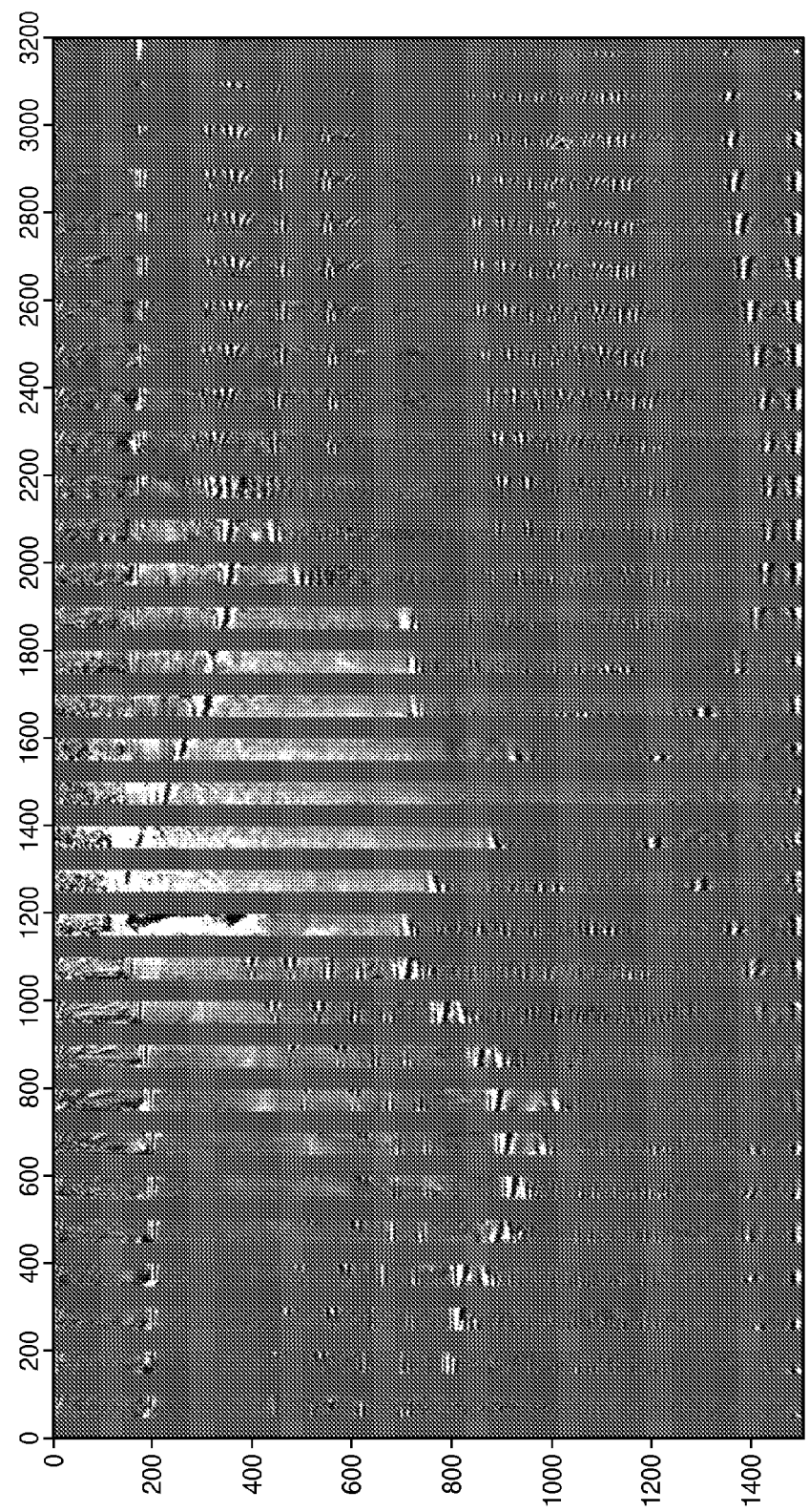
FIG. 6 illustrates the performance of the present inventive method on the same test dataset.

FIG. 5 illustrates the above described method of Sava and Fomel applied to a subsalt synthetic seismic dataset. Note the distortion of the angle gathers at the edge of the salt body, i.e. around depth indices 200 and 800. FIG. 6 illustrates the application of the present Poynting vector method as applied to the same model dataset showing much less distortion of the angle gathers.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. In particular, the description included here refers to P-waves; however those skilled in the art will readily recognize that the present method may be extended to S-waves. Persons skilled in the art will also readily recognize that in practical applications of the invention, at least some of the steps in the present inventive method are performed on or with the aid of a computer, i.e. the invention is computer implemented.

References

Cerveny, "Seismic Ray Theory", publ. Cambridge University Press, pp 28-30, (2001)

Sava and Fomel, "Coordinate-independent angle-gathers for wave equation migration," *SEG Expanded Abstracts* 24, 2052 (2005).

Thomsen, *Geophysics* 51, 1954-1966 (1986).

Tsvankin, *"Seismic Signatures and Analysis of Reflection Data in Anisotropic Media"*, publ. Pergamon, pp. 6-7 (2001).

Winbow and Clee, "Method for seismic imaging in geologically complex formations," U.S. Pat. No. 7,095,678, (2006).

Winbow, "Common reflection azimuth migration," U.S. Patent Publication No. 2010/0061184.

Xie and Wu, "Extracting angle information from migrated wavefield," *SEG Expanded Abstracts* 21, 1380 (2002).

The invention claimed is:

1. A computer-implemented method for imaging seismic data from a subsurface region and producing common reflection angle or common azimuth gathers for use in hydrocarbon exploration or production, comprising:

migrating the seismic data using reverse time migration or wave equation migration, and, as the seismic data are migrated, computing reflection angle or azimuth angle or both from available local particle velocity and pressure or stress tensor information, said available information being needed for the migration; and forming common reflection angle or common azimuth gathers of the migrated seismic data, and using them in interpreting the subsurface region for hydrocarbon exploration or production.

2. The method of claim 1, wherein said computing reflection angle or azimuth angle or both, and forming angle gathers, comprises performing the following steps on a computer:

for each image point of a plurality of selected image points, from information available as said seismic data are migrated, computing a stress tensor and local particle velocity for a seismic wave propagated forward from a seismic source location to the image point and for another seismic wave propagated backward from a seismic receiver location to the image point;

using the stress tensor and the local particle velocity to compute a direction of seismic energy propagation for the forward-propagated seismic wavefield and for the backward-propagated seismic wavefield;

if the subsurface region is an anisotropic medium, relating seismic wavefield phase velocity direction angles to direction angles of seismic energy propagation, which is the seismic wave field's group velocity vector direction;

determining a reflection angle or an azimuth angle, or both, for each image point and source-receiver pair, using said direction angle relationships if the subsurface region is an anisotropic medium, and associating an image value with each reflection angle or each azimuth angle; and forming common reflection angle gathers, or common azimuth gathers, or gathers of seismic data corresponding to both a common reflection angle and a common azimuth angle, using the associated image values.

3. The method of claim 2, further comprising computing reflector dip n̂ from said each direction of energy propagation.

4. The method of claim 2, further comprising computing the image value at each of the selected image points from a cross correlation of the forward-propagated wavefield and the backward-propagated wavefield, using either wave equation migration (WEM) or reverse time migration (RTM).

5. The method of claim 4, wherein the seismic data are P-P data, the subsurface region is isotropic, and RTM is used to migrate the seismic data, wherein downward wave propagation is computed using two differential equations that can be expressed as $$\rho \frac{\partial \vec{v}}{\partial t} = -\nabla p, \text{ and}$$

$$\frac{\partial p}{\partial t} = -\lambda \, div(\vec{v})$$

from which pressure p and velocity $\vec{v}$ are solved for, where $\rho$ is density in the subsurface region and $\lambda$ is bulk modulus.

6. The method of claim 5, wherein said direction of seismic energy propagation for the forward-propagated seismic wavefield is the direction of the vector that is computed, using said pressure and velocity, from an equation that can be expressed as:

$$\vec{s}_M(\vec{x}) = \int d\omega \, \vec{v}_s(\vec{x}, \omega) p_r^*(\vec{x}, \omega)$$

and said direction of seismic energy propagation for the backward-propagated seismic wavefield is the direction of the vector that is computed, using said pressure and velocity, from an equation that can be expressed as:

$$\vec{r}_M(\vec{x}) = \int d\omega p_s(\vec{x},\omega) \vec{v}_r^*(\vec{x},\omega)$$

where $\vec{x}$ locates the image point and $\omega$ is angular frequency of the seismic wave propagation.

7. The method of claim 6, wherein the reflection angle $\alpha$ is computed from an equation that can be expressed as:

$$\cos 2\alpha = -\hat{s}(\vec{x}) \cdot \hat{r}(\vec{x})$$

where $\hat{s}(\vec{x})$ and $\hat{r}(\vec{x})$ are unit vectors of $\vec{s}_M(\vec{x})$ and $\vec{r}_M(\vec{x})$ respectively.

8. The method of claim 7, wherein the azimuth angle $\psi$ is computed from an equation that can be expressed as:

$$\hat{m} = (\hat{s}+\hat{r})/(2\sin\alpha)$$

where $\hat{m}$ is a unit vector in the direction of $\hat{s}(\vec{x})+\hat{r}(\vec{x})$.

9. The method of claim 7, further comprising computing reflector dip at each image point from an equation that can be expressed as:

$$\hat{n} = (-\hat{s}+\hat{r})/(2\cos\alpha)$$

where $\hat{n}$ is the unit vector normal to the reflector surface at the image point.

10. The method of claim 4, further comprising using said common reflection angle gathers, or common azimuth gathers, or gathers of seismic data corresponding to both a common reflection angle and a common azimuth angle, to interpret subsurface structure from the migrated image or to develop a velocity model of the subsurface region.

11. The method of claim 2, wherein the subsurface region is isotropic, and the stress tensor reduces to a unit tensor multiplied by $-p$, where p is pressure.

12. The method of claim 2, wherein the data are migrated as shot gathers, the subsurface region is an isotropic medium, and said direction of seismic energy propagation for the forward-propagated seismic wavefield and for the backward-propagated seismic wavefield are computed by steps comprising:

selecting a velocity model for the subsurface region and a set of reflection angle bins;
forward propagating using said velocity model a seismic wave field from a selected source location, generating a source-side wave field;
backwards propagating using said velocity model the seismic wave field from receiver locations corresponding to the selected source location, generating a receiver-side wave field;
cross correlating local particle velocity field of said source-side wave field with pressure of said receiver-side wave field at selected image points, resulting in a first cross correlation;
computing a first unit vector corresponding to said first cross correlation;
cross correlating local particle velocity field of said receiver-side wave field with pressure of said source-side wave field at said selected image points, resulting in a second cross correlation; and
computing a second unit vector corresponding to said second cross correlation;
estimating a reflection angle and a reflection angle bin, or an azimuth angle and an azimuth angle bin, for each of the selected image points using said first and second unit vectors; and
cross correlating the pressures of said wave fields at the selected image points yielding a seismic image value at the selected image points, and storing the seismic image value in a data volume labeled by said reflection angle or azimuth angle bin.

13. The method of claim 2, wherein the data are migrated as receiver gathers, the subsurface region is an isotropic medium, and said directions of seismic energy propagation for the forward-propagated seismic wavefield and for the backward-propagated seismic wavefield are computed by steps comprising:

selecting a velocity model for the subsurface region and a set of reflection angle bins;
backward propagating using said velocity model a seismic wave field from a selectedreceiver location, generating a receiver-side wave field;
forward propagating using said velocity model the seismic wave field from source locations corresponding to the selected receiver location, generating a source-side wave field;
cross correlating local particle velocity field of said receiver-side wave field with pressure of said source-side wave field at selected image points, resulting in a first cross correlation;
computing a first unit vector corresponding to said first cross correlation;
cross correlating local particle velocity field of said source-side wave field with pressure of said receiver-side wave field at said selected image points, resulting in a second cross correlation; and
computing a second unit vector corresponding to said second cross correlation;
estimating a reflection angle and a reflection angle bin, or an azimuth angle and an azimuth angle bin, for the selected image points using said first and second unit vectors; and
cross correlating the pressures of said wave fields at the selected image points yielding a seismic image value at the selected image points, and storing the seismic image value in a data volume labeled by said reflection angle or azimuth angle bin.

14. The method of claim 2, wherein the directions of forward and back propagation of seismic energy is determined by the Poynting vector $\vec{S}$ whose $i^{th}$ component may be expressed as:

$$S_i = -\tau_{ij} v_j$$

where $\tau_{ij}$ is a stress tensor for the subsurface region and $v_j$ is local particle velocity component in direction j.

15. The method of claim 14, wherein the subsurface region is anisotropic, and wherein said determining a reflection angle or an azimuth angle at each image point comprises formulating equations for components in three dimensions of a group velocity vector $\vec{V}_g$ for the seismic energy propagation, said expressions being in terms of a phase velocity of the seismic energy propagation, the reflection angle, and the azimuth angle and then solving these equations for the reflection angle and azimuth angle, wherein the group velocity vector is determined from the time-averaged Poynting vector by a relationship that may be expressed as $$\vec{V}_g E_{av} = \vec{S}_{av}$$

where $E_{av}$ represents time averaged elastic wavefield energy density.

16. The method of claim 15, wherein solutions to the three equations are approximated by first-order perturbation theory as:

$$\theta = \theta_g - \frac{1}{V_{ph}} \frac{\partial V_{ph}}{\partial \theta}$$

$$\phi = -\frac{1}{\sin^2\theta_g}\left(\frac{1}{V_{ph}} \frac{\partial V_{ph}}{\partial \phi}\right)$$

where v is the phase velocity, θ is the reflection angle, φ is the azimuth angle, and $\theta_g$ is an angle that corresponds to θ for the group velocity vector.

17. The method of claim 14, where in order to smooth oscillations in the directions of forward and back propagation, a spatial window is selected around each image point, and values of components of the Poynting vector are averaged within the window.

18. The method of claim 2, wherein for each angle gather, a determination is made for each image value and corresponding image point in the angle gather as to whether they correspond to an actual reflector, and if not, the image value is discarded from the angle gather.

19. The method of claim 18, wherein said determination is made by computing the relationship for the time-averaged Poynting vector $$\vec{V}_g E_{av} = \vec{S}_{av}$$

where $E_{av}$ represents time averaged elastic wavefield energy density and $\vec{V}_g$ is the seismic energy propagation's group velocity at the image point, and wherein $\vec{S}_{av}$ is the time averaged Poynting vector. If this relationship holds to within a selected tolerance, the image value is included in the angle gather, otherwise it is rejected as noise.

20. The method of claim 1, wherein the reflection angle or azimuth angle or both are computed from available local particle velocity and stress tensor information, using a Poynting vector determined from elastic wave field energy density.

21. The method of claim 1, wherein the subsurface region is at least partly anisotropic or explicitly solid.

22. A computer program product, comprising a non-transitory computer usable medium having a computer readable program code embodied therein, said computer readable program code adapted to be executed to implement a method for imaging seismic data from a subsurface region and producing common reflection angle or common azimuth gathers for use in hydrocarbon exploration or production, said method comprising:

migrating the seismic data using reverse time migration or wave equation migration, and, as the seismic data are migrated, computing reflection angle or azimuth angle or both from available local particle velocity and pressure or stress tensor information, said available information being needed for the migration; and forming common reflection angle or common azimuth gathers of the migrated seismic data, and outputting them.

* * * * *